(12) United States Patent
Hölzel et al.

(10) Patent No.: US 10,099,537 B2
(45) Date of Patent: Oct. 16, 2018

(54) ROLLER BLIND ARRANGEMENT WITH LATERAL GUIDE

(71) Applicant: Webasto SE, Stockdorf (DE)

(72) Inventors: Dominik Hölzel, Stockdorf (DE); Andreas Rockelmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/771,780

(22) PCT Filed: Feb. 25, 2014

(86) PCT No.: PCT/EP2014/053642
§ 371 (c)(1),
(2) Date: Aug. 31, 2015

(87) PCT Pub. No.: WO2014/146871
PCT Pub. Date: Sep. 25, 2014

(65) Prior Publication Data
US 2016/0023540 A1 Jan. 28, 2016

(30) Foreign Application Priority Data
Mar. 20, 2013 (DE) .................. 10 2013 102 838

(51) Int. Cl.
*A47H 3/00* (2006.01)
*E06B 9/17* (2006.01)
(Continued)

(52) U.S. Cl.
CPC .......... *B60J 1/2013* (2013.01); *B60J 1/2019* (2013.01); *B60J 1/2027* (2013.01); *B60J 1/2052* (2013.01);
(Continued)

(58) Field of Classification Search
CPC ...... B60J 1/2013; B60J 1/2019; B60J 1/2022; B60J 1/2025; B60J 1/2052; B60J 1/2027; B60J 7/0015; E06B 9/58; E06B 2009/585
See application file for complete search history.

(56) References Cited

U.S. PATENT DOCUMENTS 6,186,587 B1 * 2/2001 Entenmann ............ B60J 1/2041
160/267.1
6,491,332 B2 * 12/2002 De Ceuster ............ B60R 5/047
160/24

(Continued)

FOREIGN PATENT DOCUMENTS

DE 10 2006 054 881 A1 5/2008
DE 10 2009 051 344 A1 2/2011
(Continued)

OTHER PUBLICATIONS

English Translation of the International Preliminary Report on Patentability, issued against International Application PCT/EP2014/053642.

(Continued)

*Primary Examiner* — Katherine W Mitchell
*Assistant Examiner* — Jeremy C Ramsey
(74) *Attorney, Agent, or Firm* — Fitch, Even, Tabin & Flannery, LLP

(57) ABSTRACT

A roller blind arrangement for shading a transparent vehicle section having a roller blind web, which can be wound to form a roller blind winding and is guided at its lateral edges in relation to a vertical longitudinal center plane of the roller blind in each case in one guide rail, as well as a drive device having a drive pinion which drives two driving means which are each guided in one of the guide rails. The driving means are in each case designed as a toothed belt. The toothed belt can have at least one flat surface for coupling to the roller blind web, and the driving means are joined within the guide (Continued)

rails to the roller blind web in each case solely via their respective flat surfaces and are detached from the roller blind web in a section arranged between the guide rails and the roller blind winding.

19 Claims, 4 Drawing Sheets

(51) Int. Cl.
    *B60J 1/20*     (2006.01)
    *B60J 7/00*     (2006.01)
    *E06B 9/58*     (2006.01)
    *E06B 9/68*     (2006.01)

(52) U.S. Cl.
    CPC ........... *B60J 1/2075* (2013.01); *B60J 7/0015* (2013.01); *E06B 9/581* (2013.01); *E06B 9/68* (2013.01)

(56) References Cited

U.S. PATENT DOCUMENTS 7,814,958 B2     10/2010   Hansen et al.

2005/0189794 A1*   9/2005   Grimm .................. B60J 7/0015
                                                                       296/214
2007/0215299 A1    9/2007   Eiselt
2008/0142172 A1    6/2008   Hansen et al.
2008/0216973 A1*   9/2008   Walter .................... B60J 1/2086
                                                                       160/313
2009/0165965 A1*   7/2009   Bergmiller ............. B60J 1/2044
                                                                      160/370.21

FOREIGN PATENT DOCUMENTS

| EP | 1 923 245 A2 | | 5/2008 | |
|----|--------------|---|--------|---|
| EP | 2 295 701 A2 | | 3/2011 | |
| FR | 2738592 A1 | * | 3/1997 | ............ B60J 1/2027 |
| JP | 2001055046 A | * | 2/2001 | |
| JP | 2006256417 A | | 9/2006 | |
| WO | 2006/012856 A1 | | 2/2006 | |
| WO | 2010/022768 A1 | | 3/2010 | |

OTHER PUBLICATIONS

International Search Report dated Sep. 29, 2014, issued in International Application PCT/EP2014/053642.

* cited by examiner

ROLLER BLIND ARRANGEMENT WITH LATERAL GUIDE

CROSS REFERENCE TO RELATED APPLICATIONS

This application is a U.S. national phase application filed under 35 U.S.C. § 371 of International Application No. PCT/EP2014/053642, filed Feb. 25, 2014, designating the United States, which claims priority from German Patent Application No. 10 2013 102 838.1, filed Mar. 20, 2013, which are hereby incorporated herein by reference in their entirety for all purposes.

The invention relates to a roller bind arrangement for a motor vehicle for shading a transparent vehicle section, having the features of the preamble of claim 1.

Such a roller blind arrangement is known from practice and comprises a roller blind web, which can be unwound from a winding device for shading a transparent roof cutout of the relevant motor vehicle or wound up onto the winding device for uncovering the transparent roof cutout. At an edge that extends in the transverse direction of the vehicle, the roller blind web is joined to the winding device in particular being designed as a winding shaft. At its edges that are arranged on both sides in relation to a vertical longitudinal centre plane of the vehicle, the roller blind web has guide straps, which are in each case guided in one guide rail extending in the longitudinal direction of the vehicle. In this way, the roller blind web can be kept tensioned in the transverse direction of the vehicle. For actuation, the roller blind arrangement can have a drive motor, which drives drive cables constituting two driving means, said cables in each case being guided to a tension bow in one of the guide rails, which tension bow is arranged at the edge of the roller blind web that faces away from the winding device. The drive cables and the guide straps of the roller blind web in each case need their own guideways in the guide rails. This requires a lot of installation space.

It is the object of the invention to create a roller blind arrangement being configured in accordance with the type referred to in the introduction and being configured so as to be optimised regarding the installation space that is needed.

In accordance with the invention, this object is attained by the roller blind arrangement according to claim 1.

Consequently, the essence of the invention is that the driving means that have at least one flat surface for joining to the roller blind web are not only used for actuating the roller blind arrangement, but also for laterally guiding the roller blind web, namely in a manner that the driving means or toothed belts, within the guide rails, in each case only rest against the roller blind web or are fixed to the same via the flat surface. In the guide rails, the roller blind web is thus directly carried along by the respective toothed belt. Outside of the guide rails, the connection between the toothed belts and the roller blind web is dissolved since the roller blind web is separated from the toothed belt there. Hence, the fabric of the roller blind web can freely be wound up to form a roller blind winding. The toothed belts, however, run separately in their respective guide without being joined to the roller blind web and can be guided circumferentially like conventional drive cables for roller blind arrangements.

In the roller blind arrangement according to the invention, the roller blind winding being formed by the roller blind web on a winding device or also without an additional winding device may have a small diameter. Due to the combined use of the driving means for actuating the roller blind web and for laterally guiding the roller blind web, the installation space that is needed in the region of the guide rails can be kept small. Guiding and driving the roller blind web may also be realised with a small number of parts.

The roller blind arrangement according to the invention may be employed in connection with a roof opening system, in a transparent fixed-roof of a motor vehicle or also in other transparent vehicle sections.

In a special embodiment of the roller blind arrangement according to the invention, the roller blind web is fed into the guide rails from the roller blind winding in the transverse direction of the roller blind, that means being transverse to the extension of the guide rails, without any deflection. Within the guide rails, the connection between the roller blind web and the toothed belts is then produced. Hence, any devices enabling the realisation of a controlled deflection of the roller blind web that might require a lot of installation space are not needed. Instead, a uniform cross-section of the roller blind web can be realised continuously between the roller blind winding and the tension bow.

In order to be able to join the roller blind web to the driving means in a reversible fashion and to also be able to guarantee a high number of actuating cycles, that means a long life span of the roller blind arrangement, the driving means, in a preferred embodiment of the roller blind arrangement according to the invention, are each designed, at the flat surface being joined to the roller blind web, as a stubble strap, hook-and-loop strap, hook strap or mushroom-type strap, which is fixed within the relevant guide rail to the roller blind web being formed from a non-transparent or at least partially transparent material. Within the guide rails, the driving means are hence in each case bonded to the material or fabric of the roller blind web by hook-and-loop fastening or by getting caught with the same, whereas the driving means and the roller blind web, outside of the guide rails, are guided at a distance to one another, hence being separated from one another. A stubble strap has to be understood to be a strap that has, at its upper surface, a plurality of fine bristles or stubbles, which may engage the material of the roller blind web for being joined to the same. The stubbles are designed so as to be continuously straight.

The surface being designed as a stubble strap, hook-and-loop strap, hook strap or mushroom-type strap is, for example, arranged at the side of the relevant driving means that faces away from the toothing, the driving means having an at least nearly rectangular cross-section.

The surface being designed as a stubble strap, hook-and-loop strap, hook strap or mushroom-type strap may have been produced in one piece from the same material and/or by way of coextrusion with the respective driving means. Alternatively, it is, however, also conceivable that the flat surface being designed as a stubble strap, hook-and-loop strap, hook strap or mushroom-type strap is formed from a strap being glued or welded onto the relevant driving means.

Depending on the material from which the roller blind web has been manufactured, the flat surface of the driving means, being designed as a stubble strap, hook-and-loop strap, hook strap or mushroom-type strap, can directly be connected or bonded by hook-and-loop fastening to the material of the roller blind web.

In particular in the context of a material that cannot be bonded by hook-and-loop fastening or by getting caught, such as a foil or tarpaulin, the roller blind web of the roller blind arrangement according to the invention may have, at its lateral edges in relation to the vertical longitudinal centre plane of the roller blind, one guide strap in each case, which is connected to a central section of the roller blind web and which has at least one section which is designed as a loop strap or velour strap, interacting with the respective surface of the relevant drive cable, said surface being designed as a stubble strap, hook-and-loop strap, hook strap or mushroom-type strap. The guide straps of the roller blind web can then be a standardised fabric module, which may be employed in roller blind arrangements according to the invention independently of the material forming the viewing surface of the roller blind web. Hence, the same friction parameters within the guide rails that are preferably equally designed in a standardised fashion can be realised at all times.

In order to make the largest possible adhesive surface available between the driving means and the roller blind web, it may be expedient to twist the driving means between the drive device and the guide rails in relation to their longitudinal axis, in each case with the aid of a twisting device, by approximately 90°. This may in particular be needed if the axis of the drive pinion of the drive device is at right angles to the plane of the extended roller blind web and the flat surfaces of the driving means to be connected to the roller blind web are arranged at the side of the driving means that faces away from the toothing.

The twisting devices for the driving means may in particular be integrated into a frame of the roller blind arrangement. A twisting device that can particularly easily be realised consists in the design of a guide tube whose inner cross-section corresponds to the inner cross-section of the relevant driving means. Thus, the guide tube is then equally designed so as to be twisted or screw-like in respect of its longitudinal axis.

Further advantages and advantageous configurations of the subject-matter of the invention can be taken from the description, from the drawing and from the claims.

In the drawing, exemplary embodiments of a roller blind arrangement according to the invention are illustrated in a schematically simplified way and will be explained in more detail in the following description. In the figures.

Figure 1:
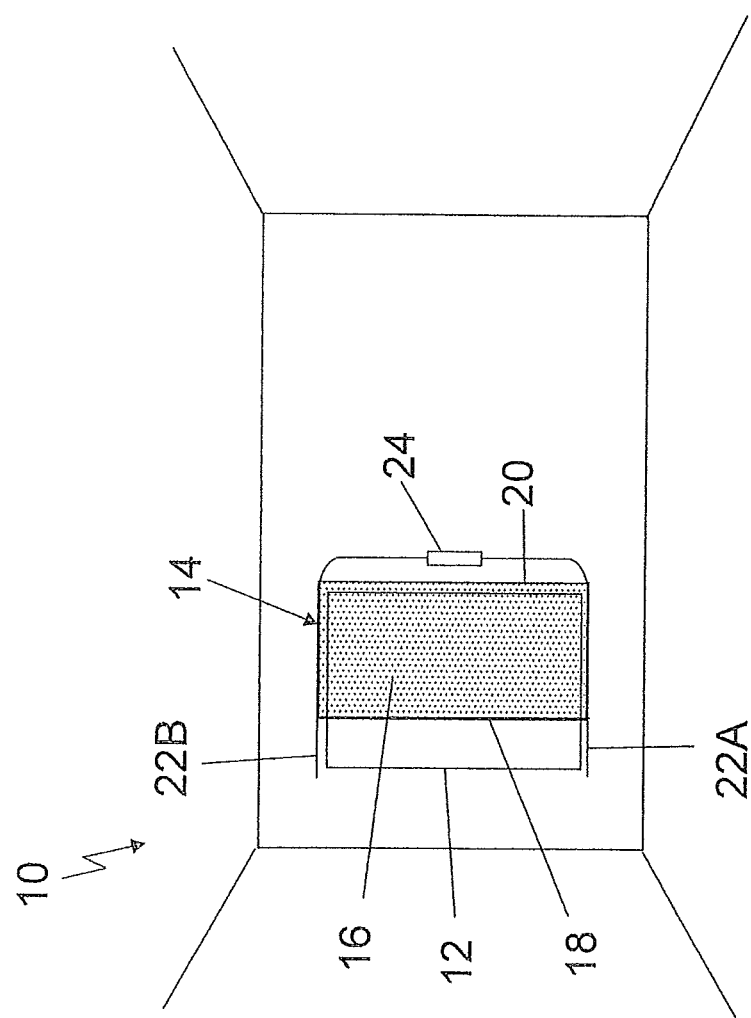
FIG. 1 shows a schematic view from above onto a roof of a motor vehicle having a roller blind arrangement according to the invention.

In the drawing, a vehicle roof 10 is illustrated, which pertains to a passenger car not being illustrated in more detail otherwise and which has a roof cutout 12, which can be closed or at least partially uncovered with the aid of a transparent lid member not being illustrated in more detail here and pertaining to a roof opening system.

For shading the roof cutout 12, the vehicle roof 10 comprises a roller blind arrangement 14, which comprises a roller blind web 16 from a fabric that can be folded or wound up.

At its free face side, the roller blind web 16 has a tension bow 18 extending in the transverse direction of the vehicle. At its edge that faces away from the tension bow 18, the roller blind web 16 has been fastened to a winding shaft 20 extending in the transverse direction of the vehicle. The winding shaft 20 comprises a winding tube which is mounted so as to be rotatable, and which has been pretensioned with the aid of a winding spring not being illustrated in more detail here in the winding-up direction of the roller blind web 16, such that the roller blind web 16, when the tension bow 18 is released or when the tension bow 18 is accordingly advanced in the direction of the winding shaft 20, automatically winds up on the winding shaft 20 to form a roller blind winding.

For guiding the tension bow 18 and for laterally guiding the roller blind web 16, the roller blind arrangement 14, in relation to a vertical longitudinal centre plane of the vehicle, on each of its two sides has one guide rail 22A or 22B extending in the longitudinal direction of the vehicle or in the direction in which the roller blind web 16 is extended along the relevant lateral edge of the roof cutout 12. The guide rails 22A and 22B can be a part of the roof opening system or also only be assigned to the roller blind arrangement 14.

For actuation, the roller blind arrangement 14 has an electrical drive motor 24, which drives a drive pinion 26 whose axis is at right angles to the plane of an extended section of the roller blind web 16. For force transmission, the drive pinion 26 engages two driving means or drive cables 28A or 28B, which are in each case designed as a plastic toothed belt. The driving means 28A and 28B are in each case guided into a guide channel 30 of the relevant guide rail 22A or 22B via one guide device 40A or 40B and in said channel to the tension bow 18 and are joined to said tension bow.

Figure 3:
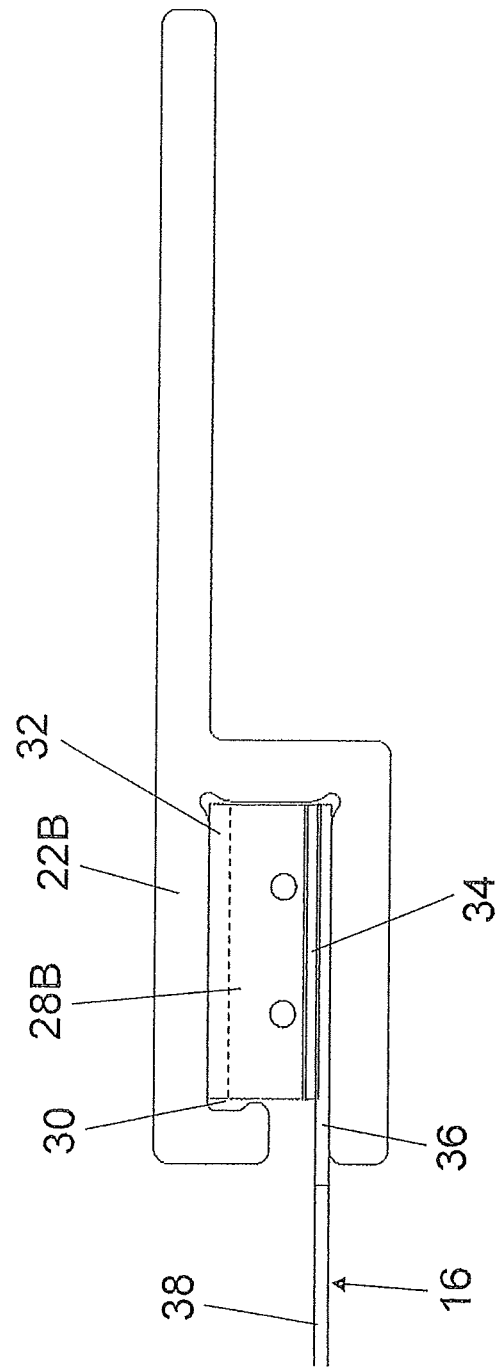
FIG. 3 shows a section through the roller blind arrangement along line in FIG. 2.

The driving means 28A and 28B each have, as it can be taken from FIG. 3, an at least largely rectangular cross-section and are provided with a toothing 32 at one side in each case, said toothing engaging the drive pinion 26. At the side that faces away from the toothing 32, constituting an at least largely flat surface, the driving means 28A and 28B are in each case designed as a stubble strap, hook-and-loop strap, hook strap or mushroom-type strap 34 or provided with such a strap, which rests on the roller blind web 16 from the top within the relevant guide rail 22A or 22B or within the relevant guide channel 30 and has got caught at the material of the roller blind web 16. Hence, the roller blind web 16 has been stretched between the two guide rails 22A and 22B in the transverse direction of the vehicle. The roller blind web 16, for getting caught with the respective stubble strap, hook-and-loop strap, hook strap or mushroom-type strap 34, in its lateral edge regions, is in each case provided with one guide strap 36 which constitutes a textile module, and which is sewn to a central section 38 of the roller blind web and may constitute a loop or velour strap. The central section 38 consists of a non-transparent material, which is unsuitable for being bonded to the driving means 28A and 28B by hook-and-loop fastening or getting caught with the same.

The driving means 28A and 28B thus each present two functional surfaces, to be precise one having the toothing 32 and one being designed with the stubble strap, hook-and-loop strap, hook strap or mushroom-type strap 34.

Figure 2:
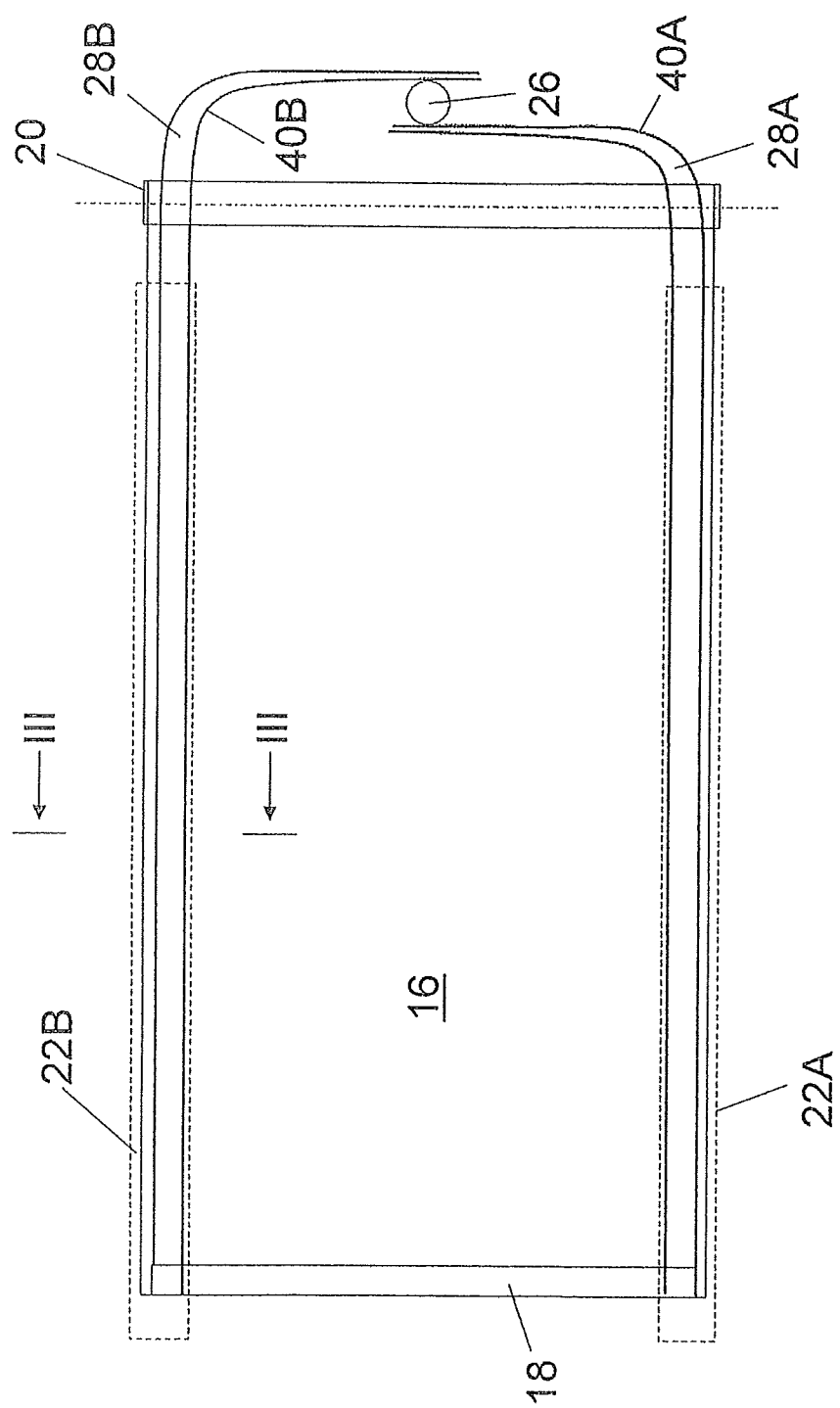
FIG. 2 shows a view from above onto the roller blind arrangement on its own.

In a section being arranged between the guide rails 22A and 22B and the drive pinion 26 of the drive motor 24, the driving means 28A and 28B are detached from the roller blind web 16, such that the same can smoothly be wound up onto the winding shaft 20. As it can be taken from FIG. 2, the roller blind web, starting from the winding shaft 20, is fed into the guide rails 22A and 22B without any deflection, that means smoothly and evenly. Detaching the driving means 28A and 28B from the roller blind web 16 is reached in that they are kept at a distance outside of the guide rails 22A and 22B, that means in FIG. 2 in the region to the right of the guide rails 22A and 22B in the upright direction of the vehicle, or are guided away from the roller blind web 16, whereas the roller blind web 16, within the guide rails 22A and 22B, is pressed against the driving means 28A and 28B, such that the lateral guide straps 36 can get caught with the respective stubble strap, hook-and-loop strap, hook strap or mushroom-type strap 34.

The driving means 28A and 28B are twisted by 90° between the drive pinion 26 of the drive motor 24 and the respective guide rail 22A or 22B in relation to the respective longitudinal axis, such that the respective toothing 32 is at the top and the driving means 28A and 28B rest on the roller blind web 16 from the top. Twisting is in each case effected with the aid of the guide device 40A or 40B constituting a twisting device, which guide device is integrated into a frame of the roller blind arrangement 14 not being illustrated in more detail and consists of a guide tube whose inner cross-section corresponds to the inner cross-section of the relevant driving means 28A or 28B. The guide devices 40A and 40B are consequently each formed from a tube that is twisted about its axis and bent.

Figure 4:
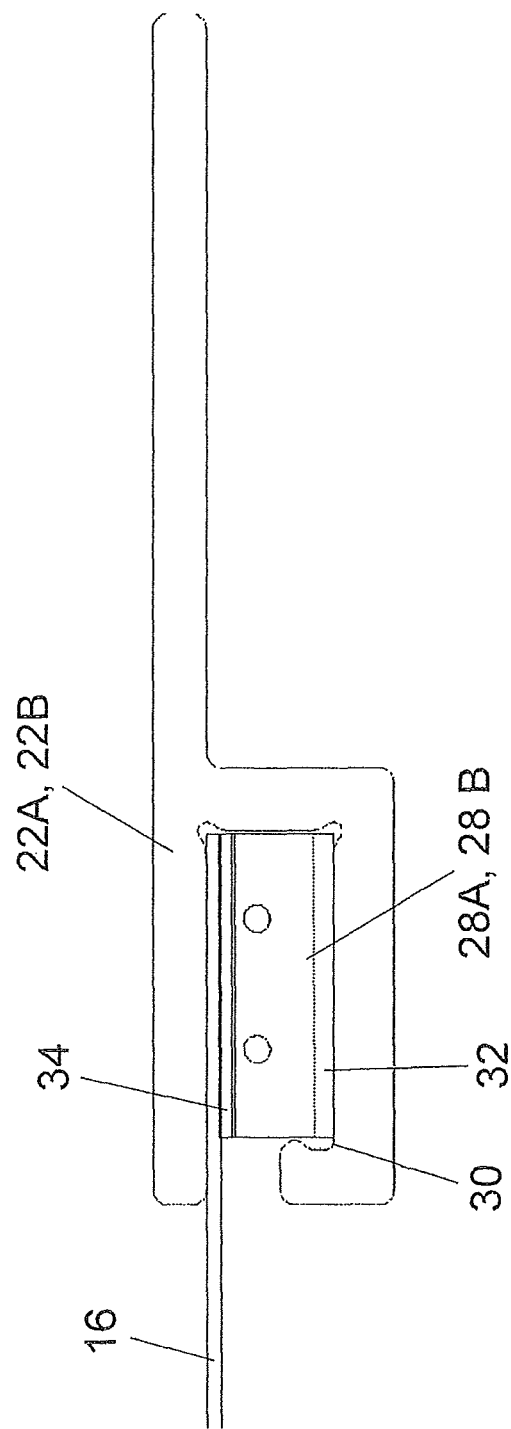
FIG. 4 shows a section that corresponds to FIG. 3, but for an alternative embodiment.

In FIG. 4, a lateral guide section of an alternative embodiment of a roller blind arrangement according to the invention is illustrated. Said roller blind arrangement largely corresponds to the roller blind arrangement according to FIGS. 1 to 3, but differs from the same in that the roller blind web 16, within the guide channels 30 of the guide rails 22A and 22B, is pressed from the top onto the driving means 28A, 28B being designed as plastic toothed belts and is kept there with the aid of a stubble strap, hook-and-loop strap, hook strap or mushroom-type strap 34, which, corresponding to the embodiment having been described hereinbefore, is coextruded with the respective driving means 28A or 28B or constitutes a glued-on strap. For the rest, the roller blind arrangement whose guide section is illustrated in FIG. 4 corresponds to the roller blind arrangement being illustrated in FIGS. 1 to 3.

The invention claimed is:

1. A roller blind arrangement for a motor vehicle for shading a transparent vehicle section, comprising:
a roller blind web which can be wound up to form a roller blind winding and is guided at its lateral edges, in relation to a vertical longitudinal center plane of the roller blind, in a respective guide rail, as well as a drive device having a drive pinion which drives two driving means, which are each guided in a respective one of the guide rails,
wherein the two driving means are each designed as a toothed belt, the toothed belt having teeth on one side and a flat surface on an opposite side, said toothed belt flat surface configured for detachable coupling to the roller blind web,
in that the two driving means are each joined within their respective guide rail to the roller blind web solely via the respective flat surface and are each detached from the roller blind web in a section arranged between the guide rails and the roller blind winding, and
wherein the teeth of the toothed belt are oriented parallel to the vertical planar orientation of the web.

2. The roller blind arrangement according to claim 1, wherein the roller blind web is fed into the guide rails from the roller blind winding in a transverse direction of the roller blind smoothly and evenly.

3. The roller blind arrangement according to claim 1, wherein the driving means are each designed, at the flat surface being joined to the roller blind web, as a stubble strap, hook-and-loop strap, or hook strap, which is fixed within the respective guide rail to the roller blind web.

4. The roller blind arrangement according to claim 3, wherein the flat surface has been produced in one piece from a same material or by way of coextrusion with the respective driving means.

5. The roller blind arrangement according to claim 3, wherein the flat surface has been formed from a strap that has been glued on or welded on.

6. The roller blind arrangement according to claim 3, wherein the roller blind web, at each of its lateral edges in relation to the vertical longitudinal centre plane of the roller blind, has one guide strap, which is connected to a central section of the roller blind web and which has at least one section being designed as a loop strap or velour strap, interacting, within the respective guide rail, with the respective flat surface of the respective driving means, said flat surface being selected from the group consisting of a stubble strap, hook-and-loop strap and hook strap.

7. The roller blind arrangement according to claim 1, wherein each of the driving means has an at least nearly rectangular cross-section, wherein the flat surface for coupling each of the driving means to the roller blind web is arranged at a side of the respective driving means that faces away from the teeth.

8. The roller blind arrangement according to claim 1, wherein the driving means are each guided to a tension bow, which is arranged at an edge of the roller blind web that faces away from the roller blind winding.

9. The roller blind arrangement according to claim 1, wherein the roller blind winding is formed on a winding device for the roller blind web.

10. The roller blind arrangement according to claim 1, wherein each of the driving means are twisted between the drive device and the guide rail in relation to a longitudinal axis of each guide rail, with the aid of a guide device, by approximately 90°.

11. The roller blind arrangement according to claim 10, wherein the guide devices are each designed as a guide tube whose inner cross-section corresponds to an inner cross-section of the respective driving means.

12. The roller blind arrangement according to claim 10, wherein the teeth of the toothed belt are oriented perpendicular to the planar orientation of the web at the drive pinion.

13. The roller blind arrangement according to claim 12, wherein each of the driving means are twisted between the drive device and the guide rail in relation to the longitudinal axis of each guide rail.

14. The roller blind arrangement according to claim 12, wherein each of the driving means change orientation between the drive device and the guide rail in relation to the longitudinal axis of each guide rail.

15. The roller blind arrangement according to claim 8, wherein each of the driving means are guided into a respective guide channel via a respective guide device and in said respective guide channel each of the driving means are guided to the tension bow, where each of the driving means are joined to said tension bow.

16. A roller blind arrangement for a motor vehicle for shading a transparent vehicle section, comprising a roller blind web (16) which can be wound up to form a roller blind winding and is guided at its lateral edges, in relation to a vertical longitudinal center plane of the roller blind, in a respective guide rail (22A, 22B), as well as a drive device (24) having a drive pinion (26) which drives two driving means (28A, 28B) which are each guided in a respective one of the guide rails (22A, 22B), wherein the driving means (28A, 28B) are each designed as a toothed belt having a rectangular cross-section, the toothed belt having teeth (32) on one side and a flat surface on an opposite side, said toothed belt flat surface configured for detachable coupling to the roller blind web (16); and in that the driving means (28A, 28B) are each joined within the respective guide rails (22A, 22B) to the roller blind web (16) in each case solely via their respective flat surfaces and are detached from the roller blind web (16) in a section arranged between the guide rails (22A, 22B) and the roller blind winding.

17. The roller blind arrangement according to claim 16, wherein each of the driving means are twisted between the drive device and the respective guide rail in relation to a longitudinal axis of each guide rail, with the aid of a guide device, by approximately 90°.

18. The roller blind arrangement according to claim 17, wherein the teeth of the toothed belt are oriented perpendicular to an orientation of the web at the drive pinion.

19. The roller blind arrangement according to claim 18, wherein each of the driving means change orientation between the drive device and the respective guide rail in relation to the longitudinal axis of each guide rail.

* * * * *